Patented Jan. 5, 1932

1,839,612

UNITED STATES PATENT OFFICE

HAROLD H. STEINOUR, OF RIVERSIDE, CALIFORNIA, ASSIGNOR TO RIVERSIDE CEMENT COMPANY, OF LOS ANGELES, CALIFORNIA, A CORPORATION OF DELAWARE

METHOD OF FORMING CEMENTITIOUS BODIES AT ELEVATED TEMPERATURES

No Drawing.      Application filed January 28, 1930.   Serial No. 424,138.

This invention relates to the forming of cementitious bodies with hydraulic cement, under conditions where the wet cementitious mixture is subjected to elevated temperatures during the period of setting thereof, and the principal object of the invention is to provide a method involving the use of an hydraulic cement of certain peculiar characteristics, whereby the initial set is caused to take place sufficiently slowly to permit the desired mixing, manipulation and placing of the wet cement mixture before such initial setting takes place.

Ordinary Portland cement has an initial setting time of from about 1 to 4 hours at ordinary temperatures, such as 70° F. At higher temperatures, however, in the neighborhood of 150 to 200° F. or higher, such as are encountered in "cementing off" oil wells or in other operations where the setting of the cement must necessarily occur at such elevated temperatures, ordinary Portland cement is found to take its initial set much too rapidly for satisfactory use, so that the setting begins before the proper mixing of the cement mix or slurry and the placing thereof in the desired position can be completed, thus preventing the cement from acquiring the necessary strength and impermeability.

A particular object of this invention is, therefore, to provide a method whereby an hydraulic cement of the Portland cement type, that is, a cement containing the same sort of constituents as are used in ordinary Portland cement, namely, lime, silica, alumina and ferric oxide, and produced by burning raw materials comprising such constituents under conditions substantially the same as used in the manufacture of ordinary Portland cement, but differing essentially from ordinary Portland cement in certain characteristic properties of composition, as hereinafter described, may be employed in forming cementitious bodies at elevated temperatures, for example, in the neighborhood of 150° to 200° F., with an initial setting time of from 1½ to 4 hours.

The method of the invention is particularly useful in "cementing off" oil wells by any of the usual methods, where the temperature in the hole is so high as to make the use of ordinary Portland cement impracticable. The particular method of placing the cementitious mixture in the desired position prior to the setting thereof, however, forms no essential part of the present invention, and the method of forming cementitious bodies with the use of this particular type of hydraulic cement may also be employed in any other cases where it is necessary or desirable that the setting of the cement take place at superatmospheric temperatures and in substantially the normal setting time of ordinary Portland cement at atmospheric temperatures.

The hydraulic cement which I use in carrying out the process of this invention is similar to ordinary Portland cement, but differs therefrom in one particularly important characteristic, namely, it contains a much smaller proportion of tricalcium aluminate than ordinary Portland cement, while containing substantially the same total percentage of alumina and iron oxide, commonly referred to as "%$R_2O_3$", as does ordinary Portland cement. According to a commonly accepted theory of clinker composition, all of the $Fe_2O_3$ in normal Portland cement combines to form tetracalcium alumino ferrite ($4CaO.Al_2O_3.Fe_2O_3$), while the $Al_2O_3$ in excess of that so combining with the $Fe_2O_3$ goes to form tricalcium aluminate ($3CaO.Al_2O_3$). It is possible, therefore, by raising the iron content of the mix relative to the alumina content while keeping the sum of the percentages of these two constituents substantially constant, to cause the formation of relatively more of the tetracalcium aluminoferrite and less of the tricalcium aluminate.

Theoretically, if the proportion of iron to alumina is equimolecular, all of the alumina goes to form $4CaO.Al_2O_3.Fe_2O_3$ and there is no $3CaO.Al_2O_3$ in the clinker. If the molecular proportion of iron oxide to alumina slightly exceeds 1 to 1, the excess iron may form a small amount of dicalcium ferrite $(2CaO.Fe_2O_3)$ in the clinker, but this does not appear to be harmful and in fact in some cases it may be preferable to provide a slight excess of iron oxide.

I have found that, for raw mixes in which the percent $R_2O_3$ is substantially within the same range as in ordinary Portland cement, as the proportion of iron oxide to alumina in the raw mix is successively increased up to or somewhat beyond equimolecular proportions, and the proportion of $3CaO.Al_2O_3$ in the clinker is consequently successively reduced, the setting time of the resulting cement tends to be successively lengthened, and that the increase in setting time thus brought about is much more marked and consistent at elevated temperatures than at ordinary atmospheric temperatures. I have further found that within a range of compositions, in which the molecular ratio of $Fe_2O_3$ varies from about 1:1.8 to 1:0.9, and in which the content of $3CaO.Al_2O_3$ in the clinker is less than 5% when calculated according to the above theory of composition, as hereinafter described, the resulting cement has a satisfactory initial set at elevated temperatures, namely, an initial setting time of from about one hour and a half to four hours at elevated temperatures, for example, in the neighborhood of 150 to 200° F. It will be understood that the desired increased ratio of iron to alumina is preferably obtained, not by simply increasing the iron content or by simply decreasing the alumina content, but by both increasing the iron content and decreasing the alumina content, as compared to ordinary Portland cement, so as to keep the total percentage of iron oxide and alumina substantially the same as in normal Portland cement. This is to be distinguished from heretofore known cements in which the proportions of both alumina and iron oxide were increased above the range found in ordinary Portland cement, for in such heretofore known cements there was no substantial change in the ratio of $Fe_2O_3$ to $Al_2O_3$ and consequently the product did not contain the low proportion of tricalcium aluminate which is an essential characteristic of the present invention.

It will be seen that, according to the above stated theory of clinker composition, the major portion of the alumina, as well as of the iron, in the cement used in this invention, is present in the form of tetracalcium alumino-ferrite $(4CaO.Al_2O_3.Fe_2O_3)$. The exact proportion of tetracalcium alumino-ferrite in the clinker does not appear to be critical, however, insofar as the setting properties at elevated temperatures is concerned, and this may vary somewhat according to conditions at different plants, but it may be stated that, in the case of the particular cements with which I have experimented, this proportion has been between about 9% and 17% by weight of the clinker, for the above stated range of tricalcium aluminate content.

The cement composition used in the method of this invention also contains added gypsum, in about the same proportion as ordinarily used in Portland cement, such addition of gypsum serving not only to still further retard the setting time at elevated temperatures, but also to improve the strength of the cement. It may be said that in general, for the best results, the finished cement should contain sufficient added gypsum to provide from 1 to 2½% $SO_3$ therein.

It has previously been proposed to produce a cement of the class commonly referred to as "slow setting cements" (namely, a cement having an abnormally long initial setting time at ordinary temperatures) in which the proportion of $Fe_2O_3$ to $Al_2O_3$ was between 1 and 1.563, but any such previous proposals did not contemplate the use of such a cement at elevated temperatures nor suggest that, at such temperatures, that particular cement would have any advantage over any other "slow setting cement". Furthermore, the previously proposed cement of this composition was not stated to contain any added gypsum, and it would seem, therefore, that the object thereof insofar as rate of setting was concerned was merely to produce a cement which, without added gypsum, would have an initial setting time as long or slightly longer than that of ordinary Portland cement containing gypsum. I have found, however, that the desired increase in initial setting time at elevated temperatures can most advantageously be secured by the use of a cement having not only a proportion of iron oxide to alumina as above set forth but also containing added gypsum within the above proportions. This is especially remarkable in view of the fact that the addition of gypsum to a cement of this composition actually accelerates (instead of retarding) the initial setting thereof at ordinary temperatures. This peculiar behavior of gypsum in connection with cements of this type will be discussed further hereinafter, but it may be pointed to here as evidence, first that the effect of added gypsum does not follow at all the same rule in the case of these cements as in the case of Portland cement and its effect on the setting time of such cements at any particular temperatures therefore cannot be inferred from its effect on the setting time of ordinary Portland cement; and second, that certain modifications in cement composition may have one effect on the setting time at ordinary temperatures and a quite different or opposite effect upon the setting time at elevated temperatures, and there is therefore no positive basis for concluding that any particular type of cement which is slow setting at ordinary temperatures would also be slow setting at elevated temperatures.

It may also be pointed out that the addition of gypsum to cements of the type above described has a double advantage arising from the anomalous behavior thereof, namely, it gives a desirable further retardation in the initial setting time at elevated temperatures and at the same time produces an acceleration in setting time at ordinary temperatures. This latter effect is also advantageous, for when the replacement of alumina by iron oxide (with the consequent reduction or entire elimination of tricalcium aluminate in the clinker) is carried to the point necessary to give a suitable increase in initial setting time at temperatures of approximately 200° F. or higher, the cement becomes entirely too slow setting at ordinary temperatures for most practical purposes. The addition of gypsum serves, then, to increase the setting time at elevated temperatures to an even more advantageous figure and to decrease the setting time at ordinary temperatures to values which are quite practical, and thus gives a cement which may be used satisfactorily, without any further additions both at ordinary temperatures and at elevated temperatures.

The method of forming cementitious bodies according to this invention does not differ substantially from the method of forming cementitious bodies with ordinary Portland cement, with the exception that an hydraulic cement as set forth above, containing the specified abnormally low content of tricalcium aluminate and formed by the burning of raw materials containing the specified abnormally high molecular ratio of iron oxide to alumina, and also containing added gypsum in proportion within the above stated range, is used instead of ordinary Portland cement. Such method, therefore, comprises in general mixing an hydraulic cement of the above described type (with or without other materials, such as are commonly used for this purpose, such as sand, aggregate, or various kinds of admixtures, including $CaCl_2$, silica, and the like) with water in such proportions as to give a wet cement mix or slurry of the proper consistency, for example, the normal consistency of standard Portland cement mix or the consistency required for the purpose in hand, continuing such mixing for a sufficient period of time to insure uniform and intimate distribution and contact therebetween, then placing such mix in the desired position and maintaining the same in that position and at the elevated temperature there prevailing until the same has set.

While considerable variation may occur in the proportions of cement and water used in making up the wet cement mix or slurry, I have found that satisfactory mixes or slurries, in which the cement exhibits the relatively slow initial set referred to above, may be prepared by mixing the cement with from about 20 to 60% of its weight of water. The invention is not to be understood, however, as restricted to the use of any particular proportion of water, as such proportion may vary between even wider limits than those just given, by reason of variations in the composition of the cement or in the manner in which the mix or slurry is to be handled or in the conditions under which setting of the cement is required to take place. Furthermore, when other materials, such as sand aggregate, or admixtures of any kind, are used in the mix, such materials may be added in any suitable proportion consistent with the results desired.

It may be stated that, in making the cement of the composition within the above limits, the desired high proportion of iron in proportion to the alumina may be obtained by employing raw materials containing such high proportion of iron or by the combination of various raw materials to produce this proportion. As a specific example, if it be assumed that there is available at a plant, limestone free from iron, alumina and silica, and consisting only of calcium and magnesium carbonates in proportions which will satisfy the ratios of CaO and MgO in the clinker, and that there is also available clay containing no lime or magnesium and composed wholly of silica, aluminum, and iron oxide in the proportions 22.0 : 5.5 : 2.5, then the following table shows the proportions of the above raw materials and of pure silica and pure iron oxide which may be used to form the clinker for two examples of typical cements of the above composition, identified therein as "cement A" and "cement B", and also shows the composition of clinker produced in each case and the molecular ratio of $Fe_2O_3$ to $Al_2O_3$ in such clinker, as well as the calculated percentage of tricalcium aluminate and other constituents in each clinker. These two cements A and B were actually prepared from clinkers having the analyses and calculated proportions of constituents as given in the table, and the initial setting time of each was determined by experiment. The initial setting time at 200 to 208° F. of each of these cements is also given. Each of these cements contained gypsum, added to the clinker in the usual manner, in an amount sufficient to provide about 1.8% $SO_3$ therein. These cements were made in substantially the same manner as normal Portland cement, that is, briefly, by grinding and mixing the raw materials, burning these materials under substantially the same temperature and other conditions as in the ordinary manufacture of Portland cement, and then grinding the clinker to about the same fineness as ordinary Portland cement and adding thereto the proper proportion of gypsum, as above stated.

Table No. I

|  | Cement A | Cement B |
|---|---|---|
| Ingredients used: | | |
| Limestone (as above defined) | 80.8% | 80.5% |
| Clay (as above defined) | 11.0% | 15.7% |
| Silica | 5.7% | 1.6% |
| Iron oxide | 2.5% | 2.2% |
| Analysis of clinker: | | |
| CaO | 65.0% | 64.5% |
| MgO | 5.0% | 5.0% |
| $SiO_2$ | 21.5% | 20.5% |
| $Al_2O_3$ | 3.15% | 4.5% |
| $Fe_2O_3$ | 5.35% | 5.5% |
| Molecular ratio of $Fe_2O_3$ to $Al_2O_3$ in clinker 1:0.925–1:1.28 | | |
| Calculated constituents of clinker: | | |
| $3CaO.Al_2O_3$ | 0.0% | 2.6% |
| $4CaO.Al_2O_3.Fe_2O_3$ | 15.0% | 16.7% |
| $2CaO.SiO_2$ | 7.7% | 7.5% |
| $3CaO.SiO_2$ | 71.6% | 68.1% |
| $2CaO.Fe_2O_3$ | 0.7% | 0.0% |
| Free lime | 0.0% | 0.0% |
| Initial setting time of cement at 200–208° F.: 230–235 Min. 160–166 Min. | | |

In calculating the percentages of tetracalcium alumino-ferrite and tricalcium aluminate in the above clinkers, the following procedure was employed, based on the above stated theory of clinker composition. Where the alumina was in excess of the iron oxide, all of the iron oxide was first calculated as tetracalcium-alumino-ferrite $$(4CaO.Al_2O_3.Fe_2O_3).$$

The alumina required for this compound was then subtracted from the total $Al_2O_3$ and the remaining $Al_2O_3$ was calculated as tricalcium aluminate ($3CaO.Al_2O_3$). The equation used for direct calculation of tricalcium aluminate was therefore

$$\%3CaO.Al_2O_3 = 2.65(\%Al_2O_3) - 1.69(\%Fe_2O_3).$$

The invention, however, does not preclude the use of cements having a slight excess of iron oxide over alumina, as illustrated, for example, by cement A in the above table. The above equation would in that case give a negative value for $\%3CaO.Al_2O_3$, and the procedure in such cases, therefore, was to report the tricalcium aluminate as zero, to calculate all of the $Al_2O_3$ as tetracalcium alumino-ferrite, and to calculate the $Fe_2O_3$, in excess of that required for this amount of $4CaO.Al_2O_3.Fe_2O_3$, as dicalcium ferrite $(2CaO.Fe_2O_3)$.

In testing the setting time of these cements at elevated temperatures, the following procedure was employed: Slurries or mixes were made up with 25 ccs. of distilled water and 52 grams of cement. This corresponds to 45 pounds of water to a bag of cement, or 48% of water based on the weight of cement, and gives a slurry of about the same consistency as is ordinarily used in cementing off oil wells. These slurries were placed in shallow tin cans provided with slip-over lids, and the cans were placed on a grid and partially submerged in water in a cylindrical vessel, the walls of which rose several inches above the top of the cans. This container was fitted with a lid which carried a thermometer whose bulb was submerged in the water when the lid was in place. The water in the cylindrical vessel was maintained at a temperature of 200° to 208° F. throughout each test. The slurries were first made up in the cans at room temperature, stirred thoroughly, the lids placed on the cans, and the cans then placed in the test vessel. At intervals the lids were removed and the samples tested with a standard Gilmore initial set needle. The lids were replaced after each test, so as to minimize evaporation from the slurries.

It will be noted that two values are recorded for the setting time of each cement. The second value gives the time at which initial set had taken place and the first gives the time of the last preceding test, so that the actual setting time lies between these two values.

It will be seen from the above table that in each of these particular cements the ratio of $Fe_2O_3$ to $Al_2O_3$ in both the raw mix and the clinker is within a range somewhat narrower than that above stated, namely, between 1:1.4 and 1:0.9, while the tricalcium aluminate content of the clinker is less than 3% as calculated by the procedure given above. In cement B, all of the iron is present in the form of tetracalcium alumino-ferrite, while the small excess of alumina is present in the form of tricalcium aluminate. In cement A, on the other hand, all of the alumina is present in the form of tetracalcium alumino-ferrite, while the slight excess of iron is present in the form of dicalcium ferrite. It will also be seen that each of these cements has an initial setting time within a range of from 2 to 4 hours at a temperature of about 200° F. The use of a cement whose characteristic properties are within this somewhat more restricted range is therefore preferable when a minimum initial setting time of from 2 to 4 hours at temperatures as high as 200° F. is desired, although I have found that any cements formed as above described and having characteristic properties within the somewhat broader range first stated, are much slower setting than ordinary Portland cement at elevated temperatures, and may be advantageously used when the temperature is not quite so high, or when an initial setting time of about 1½ hours is sufficient.

The clear cut relationship between the tricalcium aluminate content and the setting time exhibited at 200° F. is entirely lacking at 70° F., and the reduction of the proportion of this constituent does not appear to have any consistent effect on the setting time at ordinary temperatures. This is illustrated by the following table giving the results of tests made with cements of successively decreasing tricalcium aluminate content. These cements were made in substantially the same manner as above described including the addition of sufficient gypsum to give 1.8% $SO_3$ and the same procedure was used in determining the initial setting time at the elevated temperature, while the initial setting time at 70° F. was determined by the standard laboratory method.

Table No. II

|   | %3CaL. $Al_2O_3$ | %4CaO. $Al_2O_3$. $Fe_2O_3$ | Initial setting time | |
|---|---|---|---|---|
|   |   |   | 200–208° F. | 70° F. |
| 1 | 10.3 | 7.6 | 51–54 min. | 190 min. |
| 2 | 8.2 | 9.1 | 54–57 min. | 110 min. |
| 3 | 7.2 | 6.1 | 48–51 min. | 160 min. |
| 4 | 6.5 | 12.2 | 69–79 min. | 165 min. |
| 5 | 5.5 | 9.1 | 85–88 min. | 190 min. |
| 6 | 4.2 | 9.1 | 102–111 min. | 175 min. |
| 7 (cement B) | 2.6 | 16.7 | 160–166 min. | 180 min. |
| 8 | 2.2 | 15.2 | 186–195 min. | 125 min. |
| 9 (cement A) | 0.0 | 15.0 | 230–235 min. | 350 min. |

The above table shows that while the setting time at 200° F. gradually increased with successive reductions in the tricalcium aluminate content, the setting time at ordinary temperatures was very erratic and did not show this well defined relationship. It also indicates that all of the cements in which the calculated content of $3CaO.Al_2O_3$ was less than about 5% gave initial setting times of between 1½ and 4 hours at the temperature at which the tests were made.

Tests were also made on a cement made from the same clinker as the cement A of the above tables, but without addition of gypsum thereto, to determine the relative effect of gypsum on the setting time at ordinary temperature and at elevated temperatures and also the effect thereof on the strength of the cement, and the following table shows the results of these tests.

Table No. III

|   | Cement A, containing about 1.8% $SO_3$ | Cement made from same clinker, without addition of gypsum |
|---|---|---|
| Initial setting time at 200°–208° F. | 230–235 min. | 120–135 min. |
| Initial setting time at 70° F. | 3.0 min. | 545 min. |
| Compressive strength at 3 days (lbs. per sq. in.) | 3923 min. | 1379 min. |
| Compressive strength at 7 days (lbs. per sq. in.) | 5338 min. | 2716 min. |

It is evident from the above that while gypsum produces an advantageous retardation in the setting time at 200° F., its effect at ordinary temperatures is just the opposite in the case of a cement having this relatively high iron content and is sufficiently great to practically counteract any objectionable slower setting properties of the high iron cements at ordinary temperatures. This anomalous behavior of the gypsum, a very desirable constituent, necessary for the effective production of strength, as well as for the maximum retardation of set at high temperatures, gives evidence of a significant point of distinction between the setting processes at normal and at elevated temperatures, showing that the behavior at the one temperature cannot be inferred from that at the other. Any markedly slower setting properties of high iron cements at room temperature which may have been reported previously would evidently arise from lack, or deficiency, of gypsum or from an iron content in excess of that employed in these experiments, and consequently have no true reference to compositions such as herein specified or to their behavior at elevated temperatures.

I claim:

1. The method of forming cementitious bodies at elevated temperatures which comprises forming a wet cement mix of suitable consistency and comprising an hydraulic cement of the Portland type in which the molecular ratio of $Fe_2O_3$ to $Al_2O_3$ is between 1:1.8 and 1:0.9 and in which the sum of the percentages of iron oxide and alumina is substantially the same as in normal Portland cement, said cement also containing sufficient added gypsum to provide from 1 to 2½% $SO_3$ therein, placing such mix in the desired position, and allowing the same to set at a temperature materially above ordinary atmospheric temperature.

2. The method of forming cementitious bodies at elevated temperatures which comprises forming a wet cement mix of suitable consistency and comprising an hydraulic cement of the Portland type in which the molecular ratio of $Fe_2O_3$ to $Al_2O_3$ is between 1:1.4 and 1:0.9 and in which the sum of the percentages of iron oxide and alumina is substantially the same as in normal Portland cement, said cement also containing sufficient added gypsum to provide from 1 to 2½% $SO_3$ therein, placing such mix in the desired position, and allowing the same to set at a temperature of about 200° F. or higher, said cement having an initial setting time of from 2 to 4 hours at such temperature.

3. The method of forming cementitious bodies at elevated temperatures which comprises forming a wet cement mix of suitable consistency and comprising an hydraulic cement of the Portland type containing less than 5% tricalcium aluminate as calculated by the equation $$\%3CaO.Al_2O_3 = 2.65(\%Al_2O_3) - 1.69(\%Fe_2O_3),$$

and also containing sufficient added gypsum to provide from 1 to 2½% $SO_3$ in said cement, placing such mix in the desired position, and allowing the same to set at a temperature materially above atmospheric temperature, such cement having an initial setting time of from 1½ to 4 hours at such temperature.

4. The method of forming cementitious bodies at elevated temperatures which comprises forming a wet cement mix of suitable consistency and comprising an hydraulic cement of the Portland type containing less than 3% tricalcium aluminate as calculated by the equation $$\%3CaO.Al_2O_3 = 2.65(\%Al_2O_3) - 1.69(\%Fe_2O_3)$$

and also containing sufficient added gypsum to provide from 1 to 2½% $SO_3$ in said cement, placing such mix in the desired position and allowing the same to set at a temperature of about 200° F. or higher, such cement having an initial setting time of from about 2 to 4 hours at such temperature.

5. The method of forming cementitious bodies at elevated temperatures which comprises mixing an hydraulic cement of the Portland type containing less than 5% tricalcium aluminate as calculated by the equation $$\%3CaO.Al_2O_3 = 2.65(\%Al_2O_3) - 1.69(\%Fe_2O_3)$$

and also containing sufficient added gypsum to provide from 1 to 2½% $SO_3$ therein, with from 20 to 60% of its weight of water, to form a cement mix of the desired consistency, placing said mix in the desired position and allowing the same to set at a temperature materially in excess of atmospheric temperature.

6. The method of forming cementitious bodies at temperatures of approximately 200° F. or higher which comprises mixing an hydraulic cement of the Portland type containing less than 3% tricalcium aluminate as calculated by the equation $$\%3CaO.Al_2O_3 = 2.65(\%Al_2O_3) - 1.69(\%Fe_2O_3)$$

and also containing sufficient added gypsum to provide from 1 to 2½% $SO_3$ therein, with from about 20 to 60% of its weight of water, to form a cement mix of the desired consistency, placing said mix in the desired position, and allowing the same to set at a temperature such as above stated.

In testimony whereof I have hereunto subscribed my name this 22d day of January, 1930.

HAROLD H. STEINOUR.